July 22, 1958

M. LOOMIS 2,843,865

DOCKBOARDS

Filed June 2, 1952

INVENTOR.
Martin Loomis.
BY
Kanman & Kanman
ATTORNEYS

United States Patent Office 2,843,865
Patented July 22, 1958

2,843,865

DOCKBOARDS

Martin Loomis, Clare, Mich., assignor to Loomis Machine Company, Clare, Mich.

Application June 2, 1952, Serial No. 291,284

2 Claims. (Cl. 14—71)

This invention relates to dockboards for use in bridging the space between a loading dock or platform and a railroad car, truck or other carrier spotted beside a dock or platform. Usually the car or truck is higher or lower than the loading dock platform, and it is further subject to height variations as the load changes, or the vehicle rocks on its springs due to variations in loads, all of which is compensated for in my new dockboard, the ramp of which extends at an angle between the two floor levels and forms a connecting floor or runway over which goods of all kinds may be wheeled or carried.

One of the prime objects of the invention is to design a very simple, practical and easily operable counterbalanced dockboard which can be readily manufactured and assembled, and which is so designed that the ramp can be easily and quickly raised and lowered with a minimum of manual effort.

Another object of the invention is to provide a dockboard which bridges the space between the platform and the carrier; which compensates for rocking of the car or carrier; which is firmly held against creeping and displacement, and which forms a safe, smooth trucking surface from the dock to the carrier.

A further object is to provide a unit dockboard which can be manufactured and assembled in the shop ready for mounting in a pit or other opening.

To the accomplishment of the foregoing and related ends, said invention then consists in the means hereinafter fully described and particularly pointed out in the claims, the annexed drawings and following description setting forth, in detail, certain means and one mode of carrying out the invention, such disclosed means and mode illustrating, however, but one of the various ways in which the principle of the invention may be used.

The transfer of freight and other goods from carrier to a dock is usually heavy work, and the dock board must necessarily be of rugged, substantial construction to withstand the wear and strains due to loading and unloading operations.

Figure 1:
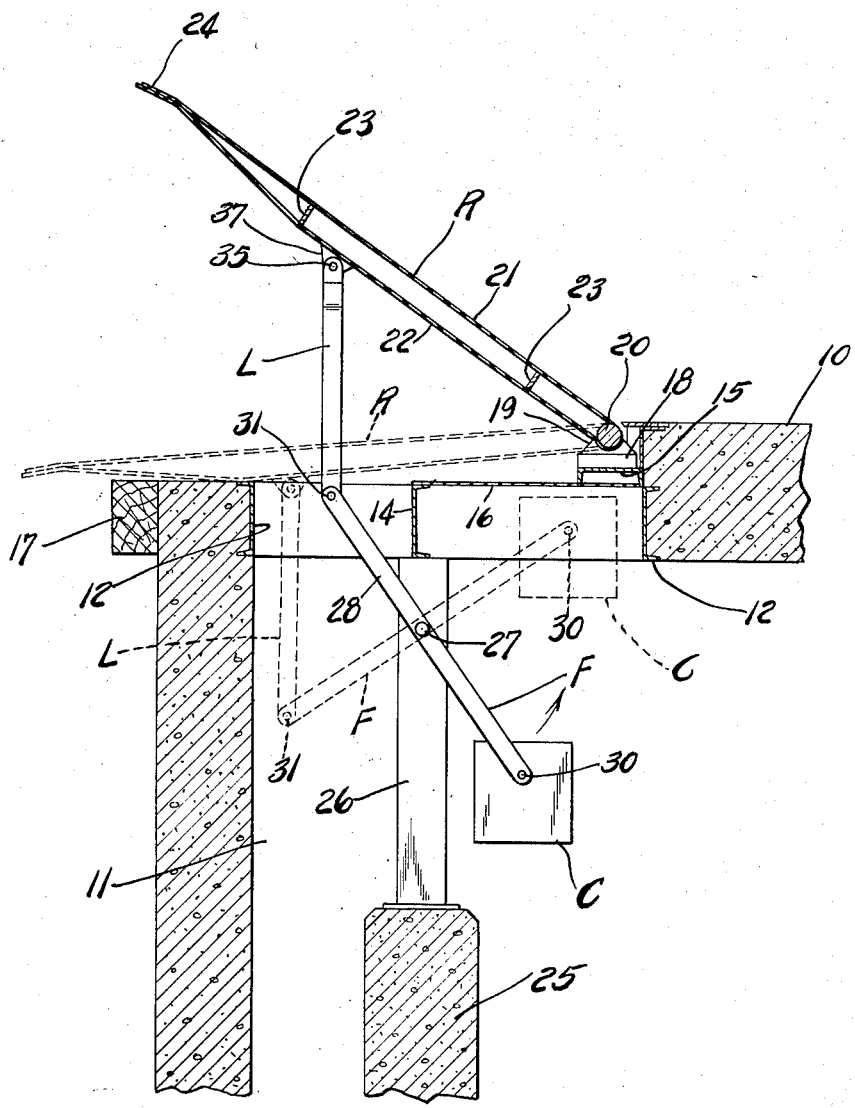
Fig. 1 is a sectional, end elevational view of a loading platform with my improved dockboard in position thereon, the solid lines showing the ramp swung to raised position, the broken lines showing the ramp swung down and ready for use.
Figure 2:
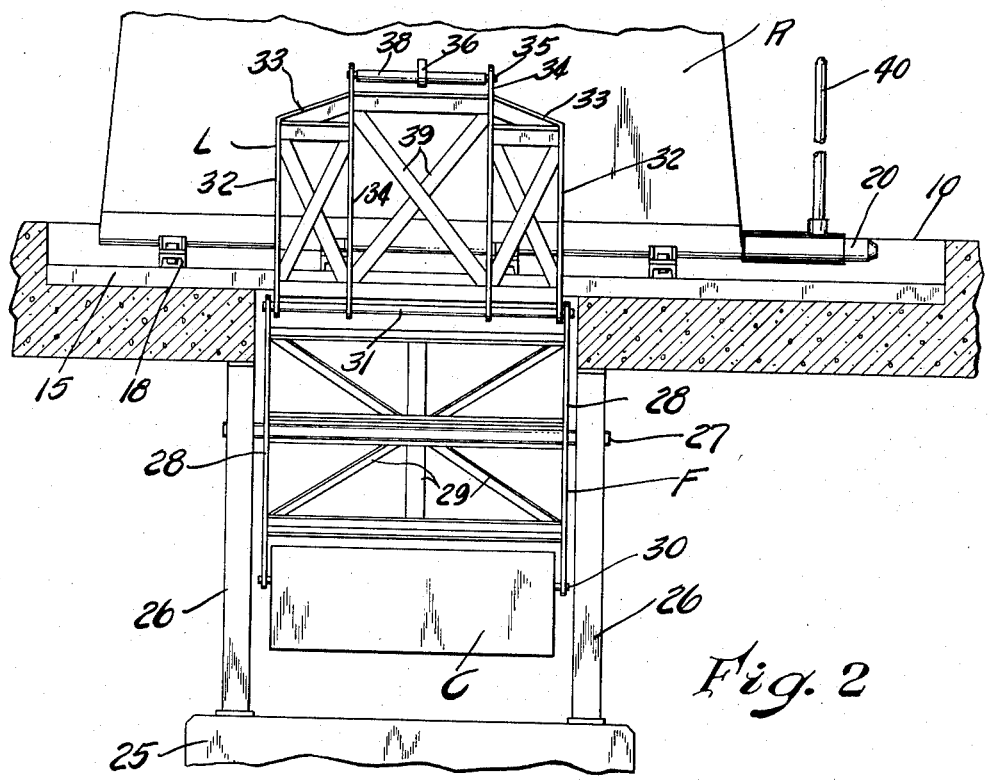
Fig. 2 is a longitudinal, part sectional, front elevational view showing the ramp in partly raised position.
Figure 3:
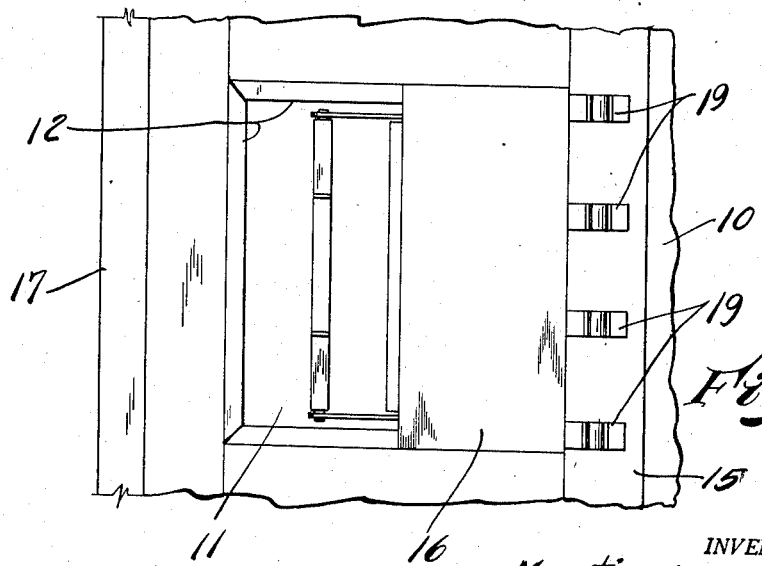
Fig. 3 is a fragmentary, top plan view.

Furthermore, it is necessary that the ramp be swung upwardly and out of the clearance lines or area of the cars, trucks or carriers when they are being moved or spotted, making it necessary that the ramp swinging operation be easy and quick to conserve time and effort, and this I have accomplished in the instant design shown in the accompanying drawings in which the numeral 10 indicates a dock formed of concrete or other desired material, and provided with a pit 11 in which the dockboard unit D is housed. This pit is dimensioned to freely accommodate the unit, the open upper end being framed by beams 12, and a similar channel or beam 14 spans the open end, all as clearly shown in Fig. 1 of the drawings.

An elongated channel 15 spans the inner edge of the pit 11 and a plate 16 is welded or otherwise secured to the channels to form a platform and cover for the upper open end of the pit.

A preferably wood beam 17 is secured to the upper front face of the dock in any desired manner to form a bumper and the ramp R bears thereon when not in use, it being understood that the outer free end of the ramp rests on the floor of the car or carrier (not shown) when it is being loaded or unloaded.

Relatively short channel members 18 are provided on the member 15 in spaced-apart relation and bearing blocks or trunnions 19 are mounted thereon and revolvably accommodate a shaft 20 to which the one end of the ramp R is welded or otherwise secured, said ramp comprising upper and lower plates 21 and 22, spaced-apart by means of spacer bars 23 which are interposed therebetween, the outer free ends of the plates being welded together in intimate, facial contact to form a thin-lipped section 24 which bears on the wood beam 17 when the ramp is not in use.

A concrete footing or pier 25 is provided in the pit 11, and spaced-apart, vertical uprights 26—26 are mounted thereon with their upper ends secured to the channel 14 which spans the pit opening.

A horizontally disposed rod 27 spans the uprights 26—26, and a fabricated lever member F is journaled on said lever at a point intermediate its length, said lever including side members 28—28 suitably braced as at 29, and a counterweight C is pivotally secured to the lower ends of said side members by means of a horizontally disposed rod 30, said rod projecting through the counterweight C as shown, and I wish to direct particular attention to the fact that the pivot point of the lever F is not equidistant from the ends thereof, the distance from the center or pivot point of the lower end of the lever being greater than the distance from the center pivot point to the upper end of said lever for a purpose to be presently described.

A fabricated link assembly L is pivotally connected to the upper ends of the side bars or members 28—28 by means of the horizontally disposed rod 31, said assembly comprising spaced-apart side bars 32—32, the upper ends of which are bent toward each other as at 33, and spaced-apart bars 34 connect to the rod 31 and to a horizontally disposed pin 35 which spans the bars 34—34 and extends through an eye 36 provided in bearing 37 which is secured to the lower face of the ramp R in any desired manner, and separators 38 serve to center the bearing 37 on the pin, the assembly L being suitably reinforced by braces 39 as usual.

The shaft 20 projects beyond the one end of the ramp R, and a tilt lever 40 is secured thereon so that the ramp may be tilted to desired adjusted position. The weight C serves as a counterbalance; it is swung down to position shown in solid lines in Fig. 1 of the drawings when the ramp is raised, and is swung up to a point approximately 45 degrees above the horizontal pivot point 27 (see broken line position) when the ramp is lowered, the fact that the counterweight is mounted on the longer section of the lever L and further due to the fact that the counterweight is pivotally mounted off center, provides the balanced leverage necessary to insure easy operation of the ramp.

Inasmuch as carriers do not always approach the dock directly in front of or in alignment with the ramp of the dockboard, a lateral movement is necessary. This is accomplished as set forth in recently issued Patent No.

2,592,919 to myself and Wayne M. Sanderson, granted April 15, 1952, and I do not deem it necessary to show or describe this transverse shifting mechanism, as it is the same as that shown and described in the above-identified patent.

The construction described provides for easy and quick manipulation of the dockboard, and the ramp can be swung up by merely swinging the tilt lever 40. The ramp is capable of being swung through an arc of such magnitude that the front edge of the ramp may be located substantially rearwardly of the plane of the front of the dock, as is shown by the full line disclosure in Fig. 1, thereby eliminating any projecting ramp or section on the loading dock when the carrier is moved to position for loading and/or unloading.

The design is very rugged and substantial; it can be easily and quickly operated with a minimum of manual effort, and the ramp will remain in either its raised or lowered position as desired.

From the foregoing description, it will be obvious that I have perfected a very simple, practical, and substantial dockboard which is easily operable, and which can be readily adjusted to either raised or lowered position.

What I claim is:

1. In combination with a loading dock having a pit therein, support means disposed within said pit, a ramp member bridging said pit, a shaft secured at the rear edge of said ramp member, trunnions mounted at the rear edge of said pit and receiving said shaft so as hingedly to mount said ramp member at the rear edge of said pit for upward swinging movement from a substantially horizontal position, in which the ramp member rests on the forward portion of said dock with its front edge projecting forwardly beyond the plane of the front of said dock, through an arc of such magnitude as to locate said front edge of said ramp member rearwardly of the plane of the front of said dock, a lever pivotally carried under said ramp member by said support means at a point interjacent its ends, a link pivotally connecting one end of said lever and the ramp member, and a counterweight mounted on the opposite end of said lever.

2. The combination with a loading dock having a pit therein and having trunnions mounted at the rear edge of said pit, of a dockboard for bridging the space between said dock and a floor of different height, said dockboard comprising a longitudinally disposed ramp structure having a shaft at its rear edge received by said trunnions so as to hinge said ramp structure at the rear edge of said pit with the forward portion of the ramp structure bearing on the front portion of said dock adjacent the pit and with the front edge of said ramp structure projecting forwardly beyond the plane of the front of the dock when said ramp structure is in lowered generally horizontal position, said ramp structure being swingable about its hinge upwardly from said lowered position through an arc of such magnitude as to locate said front edge of said ramp structure rearwardly of the plane of the front of the dock, support means within said pit interjacent the ends of said ramp, a transversely disposed shaft carried by said support means, a longitudinally disposed, linearly extending lever structure including transversely spaced, parallel bars pivotally mounted on said transversely disposed shaft at a point interjacent their ends, a link structure pivotally connecting the outer end of said lever and ramp, a rod spanning the rear ends of said bars and a transversely extending counterweight pivotally mounted off-center on the said rod with the center of gravity of said counterweight below the said rod.

References Cited in the file of this patent
UNITED STATES PATENTS

| | | |
|---|---|---|
| 1,112,543 | Love | Oct. 6, 1914 |
| 1,905,947 | Morgan | Apr. 25, 1933 |
| 2,585,695 | Snow | Feb. 12, 1952 |